3,195,344
DEWPOINT MEASURING SYSTEM
Charles C. Francisco, Watertown, Mass., assignor to Cambridge Systems, Inc., Watertown, Mass., a corporation of Massachusetts
Filed Jan. 28, 1963, Ser. No. 254,235
12 Claims. (Cl. 73—17)

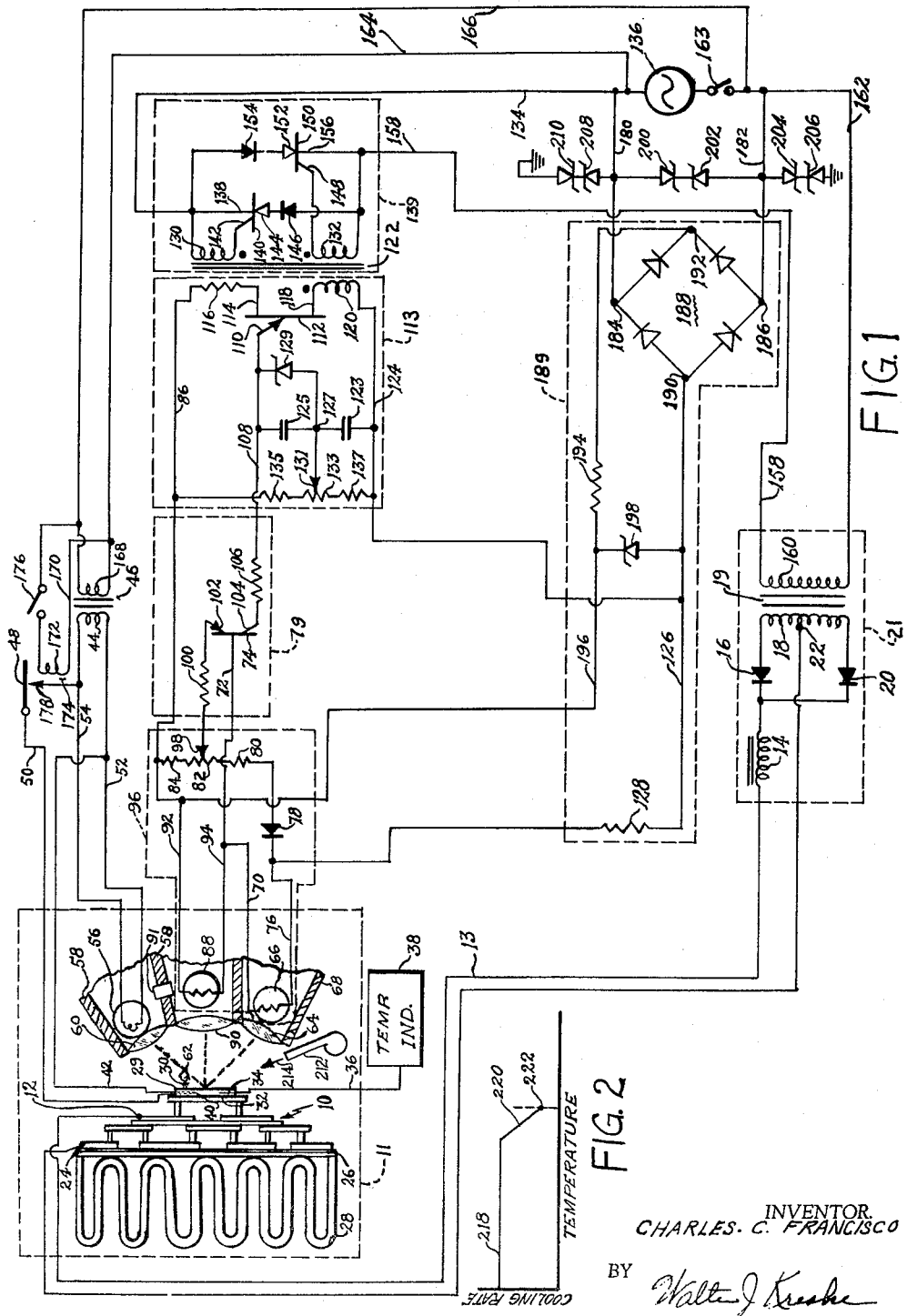

This invention relates to a dewpoint measuring system of the type utilizing a reflective surface cooled to the temperature at which the vapor of a gas whose dewpoint is being measured condenses, and more particularly to an improved dewpoint measuring system wherein the rate of cooling of the surface is controlled by the dewpoint itself.

In cooled reflective surface type dewpoint apparatus, it has been customary in the past to provide a cooling source having a substantially constant rate of cooling of the reflective surface and a separate variable source of heat to then counteract the cooling source to bring the temperature of the reflective surface to the desired temperature. Such diametrically opposed functional arrangement of separate cooling and heating sources operating at the same time on the reflective surface is not only inefficient, but also entails relatively voluminous and cumbersome apparatus with serious limitations as to the scope of practical applications.

For example, in the case of surfaces which are cooled at a constant rate in conventional manner such as by evaporating liquids or by conventional mechanical refrigerating systems, the inherent bulkiness of the structures limits portability and prevents positioning of the reflective surface in locations of confined space accommodations. Even where thermoelectric coolers which work on the principle of constant rate of cooling counteracted by a heater are used, they require unnecessarily large energy dissipating arrangements which again entail a relatively large structure adjacent to the reflective surface. Also, because of such large heat dissipating need and the inherent proximity of the heat dissipating structure to the reflective surface, they present an undesirable tendency toward influencing related meteorological measurements such as the temperature of free air customarily taken by complementary instruments adjacent to the reflective surface. Even more undesirable is the limiting effect of such construction on use of the instrument at high altitudes where rarified atmospheric conditions have decreased capability for heat dissipation.

These problems have been overcome in the present invention which also incorporates other desirable features and advantages. Among these other desirable features and advantages achieved by the present invention is the provision of a dewpoint measuring system which will make continuous and accurate dewpoint measurements for long periods of time even under contaminating gaseous conditions wherein the reflective surface tends to lose some of its reflectivity from contaminating residues deposited thereon. Additionally, the system lends itself to relatively compact, hand portable construction. It also lends itself to separable component construction which includes a separate, relatively small and compact dewpoint sensor unit which may be positioned at a desired location for dewpoint measurement remote to the remaining operating and indicating equipment. Also, the system has substantially no mechanical working parts and is almost completely of an electronic circuit nature with solid state devices in a configuration which achieves extremely long, reliable service life.

A primary object of the present invention is the provision of a dewpoint measuring system which minimizes effect of residue contamination of the reflective surfaces on the dewpoint being measured.

And another object is the provision of a dewpoint measuring system which is completely automatic in its operation for automatically and continuously tracking and indicating dewpoint temperatures for indefinite periods of time.

And a still further object is the provision of a dewpoint measuring system utilizing a cooled reflective surface, the rate of cooling whereof is determined by the dewpoint itself.

And a further object is the provision of a dewpoint measuring system utilizing a cooled reflective surface, the rate of cooling whereof is proportional to and controlled by the dewpoint itself.

And another object is the provision of a dewpoint measuring system with substantially no mechanically working parts.

And another object is the provision of a dewpoint measuring system which lends itself to extremely compact and light, readily portable construction.

Another object is the provision of a dewpoint measuring system which readily lends itself to construction in form of separable function units.

And another object is the provision of a dewpoint measuring system having a compact separable dewpoint sensing unit convenient for placement at a desired dewpoint measuring location remote to the operating and indicating circuitry.

A further object is the provision of a dewpoint measuring system which is relatively simple in construction, accurate and reliable in operation, inexpensive to manufacture and easy to operate.

These and other objects, features and advantages are achieved generally by the provision of a thermoelectric cooler having a cooling rate proportional to the rate of electric current flow through the cooler, a mirror surface in thermally responsive relation to the cold side of the cooler, an optical sensing transducer in responsive relation to dew formation on the mirror surface and arranged to effect an electric output signal corresponding to reflectivity changes from dew formation on the mirror surface, and an electric current gating arrangement responsive to the transducer output signal for passing electric current from a current source through the cooler at a rate proportional to the intensity of the transducer output signal.

By providing in the optical transducer a source of illumination for the mirror surface and a pair of photosensitive cells with one cell positioned to receive directly reflected light from the illuminated mirror surface and the other positioned to receive scatter light from the illuminated mirror surface, a very sensitive arrangement to changes in reflectivity by dew formation on the mirror surface is thereby achieved.

By providing photoresistors as the photosensitive cells and arranging each photoresistor as a separate leg in a resistance bridge formation, extremely accurate output signals corresponding to dew formation conditions on the mirror surface are thereby achieved, as well as one which lends itself to minimizing effects of contamination deposits on the mirror surface.

By providing the scatter light photoresistor with auxiliary illumination to thereby raise the overall operating illumination level, minimization of temperature effects on transducer output inherent in photoresistors is thereby achieved.

By including in the current gating arrangement a silicon controlled rectifier in series with the current source, a pulse transformer coupled to the gate of the silicon controlled rectifier and a capacitor pulse forming circuit in responsive relation to the transducer output signal for causing gating current pulses in the pulse transformer, a reliable and compact arrangement for proportional control of current rate of flow to the thermoelectric cooler is thereby achieved.

These and other features, objects and advantages will be better understood from the following description taken in connection with the accompanying drawings illustrating the invention and wherein:

FIG. 1 is a schematic diagram of a preferred embodiment of the invention;

FIG. 2 is a graph to more clearly show operation of the FIG. 1 embodiment.

Referring to FIG. 1 in more detail, the preferred embodiment of the dewpoint measuring system has a dewpoint sensing structure 11 which includes a thermoelectric cooler 10 utilizing Peltier effect for cooling and which in the present instance is preferably a PN junction two stage cooler for increased operating temperature range. Alternative embodiments suitable for use in the present invention as dewpoint sensing structure 11 are shown and described in my application of even date entitled Dewpoint Sensing Structure. One terminal 12 of the thermoelectric cooler 10 is coupled through an electric cable 13, a smoothing inductor 14 and a rectifier 16 to one side of a secondary 18 of a power transformer 19, the other side of which is coupled back through a rectifier 20 to a point between the smoothing inductor 14 and the rectifier 16. The secondary 18 has a centertap 22 coupled to the other terminal 24 of the thermoelectric cooler 10. The power transformer 19, rectifiers 16 and 20 and smoothing capacitor 14 with associated circuitry form a suitable full wave rectified direct current source 21 for the cooler 10. The thermoelectric cooler 10 is positioned in heat conductive relation through a thin dielectric element 26 such as mica, woven glass or other suitable dielectric material to a heat dissipating, highly heat conductive heat exchanger 28 of such material as copper or aluminum. The cold side of the thermoelectric cooler 10 has fixed in heat conductive engagement therewith, a heat conductive member 29 preferably of such material as copper or silver and having a highly reflective or mirror surface 30 which may consist of a polished silver surface plated with a thin rhodium flash thereover to retard corrosion. The reflective surface 30 is coupled in heat conductive engagement with the cold side of the thermoelectric cooler 10 through a thin layer of dielectric material 32 such as the dielectric material 26. The heat conducting element 29 carries therein a temperature sensitive element 34 preferably a temperature variable resistance sensor.

The temperature sensitive element 34 is coupled through a channel 36 which is preferably a self compensating 3 wire system to an indicating device 38 calibrated to indicate temperature at the resistor 34. Inasmuch as the heat sensitive element 34 has a linear resistance change with change in temperature, the temperature indicator 38 may also be a digital type indicator.

The heat conductor element 29 also has included therein a heater resistor 40 coupled on one side through a line 42 to one side of a secondary 44 of a power transformer 46, the other side of which is coupled through a normally open contact arm 48 in a relay 174 and line 50 for operation as will hereinafter be more fully described.

Also, coupled across the secondary 44 by lines 52 and 54 respectively is an electric light bulb which is positioned within an opaque light directing baffle 58 so as to illuminate the mirror surface 30 through a condensing lens 60 at an angle 62 with the reflecting surface 30 such that directly reflected light from the reflecting surface 30 will pass through another condensing lens 64 onto a photoresistor element or cell 66.

The photoresistive cell 66 is confined in an opaque baffle arrangement 68 which prevents light from reaching it from sources other than the reflective surface 30. The photoresistor cell 66 is coupled on one side through a line 70 to the base 72 of an amplifying transistor 74. The other side of the photoresistor cell 66 is coupled through a line 76 and a rectifier 78 through a resistor chain 80, including a potentiometer 82, and resistor 84 to a direct current power line 86.

A second photoresistor element 88 which may be similar to the photoresistor element 66 is in this instance positioned in perpendicular relation to the reflective surface 30 so as to receive only scatter light from the reflective surface 30 through a condensing lens 90. Also, to augment the scatter light and thereby raise the operating illumination level, an auxiliary source of light is provided to the photoresistor 88 through a plastic light conducting member 91 in the wall of the baffle 58. One side of the photoresistor element 88 is coupled through a line 92 to the power line 86. The other side of the photoresistor element 88 is coupled through a line 94 to the base 72 of the amplifying transistor 74 in an amplifier stage 79. The photoresistor elements 66 and 88, rectifier 78 and resistor chain 80 with associated circuitry comprise a photosensitive resistance bridge 96 which will be hereinafter further described.

The potentiometer resistor 82 is coupled through a wiper arm 98 and resistor 100 to an emitter 102 of the amplifying transistor 74, a collector 104 of which is coupled through a resistor 106 and line 108 to an emitter 110 of a unijunction transistor 112 in a pulse forming circuit 113. The unijunction transistor 112 has one base 114 coupled through a resistor 116 to the direct current power line 86. Another base 118 of the unijunction transistor 112 is coupled through a primary 120 of a pulse transformer 122 and a line 124 to common line 126. The common line 126 is also coupled through a resistor 128 to line 76 at the photoresistor element 66.

Coupled between lines 124 and 108 are a pair of series capacitors 123 and 125 with a point 127 between the capacitors 123 and 125 being coupled through a zener diode 129 to the line 108. The point 127 is also coupled through an adjusting arm 131 to a potentiometer resistor 133 which has one side coupled through a resistor 135 to the power line 86 and the other side coupled through a resistor 137 to the line 124.

The pulse transformer 122 has a pair of secondaries 130 and 132 in a silicon controlled rectifier circuit 139. One side of the secondary 130 is coupled through a line 134 to one side of an alternating current power source 136 such as the conventional 115 volt, 60 cycle alternating house current power source. The same side of the secondary 130 is also coupled to the cathode 138 of a silicon controlled rectifier 140. The other side of the secondary 130 is coupled to gate 142 of the silicon controlled rectifier 140, the anode 144 of which is coupled through a rectifier 146 to one side of the secondary 132 which is also coupled to the cathode 156 of another silicon controlled rectifier 150 having an anode 152 coupled through another rectifier 154 to the power line 134.

The silicon controlled rectifier 150 also has a gate 148 coupled to the other side of the secondary 132. The cathode 156 of rectifier 152 is coupled through line 158 to one side of a primary 160 of the power transformer 19. The other side of the primary 160 is coupled through a power line 162 and a push button switch 163 to the other side of the alternating current power source 136.

The power source 136 is also coupled through lines 164 and 166 across a primary 168 in the power transformer 46. The line 164 is coupled through a line 170 to one side of a solenoid 172 of a relay 174, the other side of which is coupled through a push-button switch 176 to power line 166 in a manner that when the circuit is closed by depressing the push-button switch 176, the solenoid 174 will cause the moveable arm 48 to engage terminal 178 which is coupled to the line 54, thereby completing the circuit to the resistor heater element 40.

The power source 136 is also coupled through lines 180 and 182 across opposed terminals 184 and 186 respectively in a rectifier bridge 188 in a direct current source 189. The rectifier bridge 188 has quadrature terminals 190 and 192. The quadrature terminal 190 is coupled to the common line 126 and the quadrature terminal 192 is coupled through a resistor 194 and line 196 to the power line 86. A zener diode 198 is coupled across the lines 196 and 126 to maintain constant voltage thereacross.

Back-to-back zener diodes 200 and 202 are coupled across the power lines 180 and 182. Similar back-to-back zener diodes 204 and 206 are coupled between the power line 182 and ground. Similarly, back-to-back zener diodes 208 and 210 are coupled between the power line 180 and ground. The pairs of zener diodes 110 and 108, 200 and 202, and 204 and 206 comprise a surge suppressor network.

A conventional fan and motor 212 is provided at one side of the reflective surface 30 and directed so as to move air or other gaseous medium in the direction of arrow 214 so as to continually provide representative sampling of the gas across the reflective surface 30.

In the operation of the dewpoint measuring system in the FIG. 1 embodiment, the entire continuous cycle of operation is started by closing the switch 163 which thereby carries the power source 136 to provide power through the power transformer 46 so as to illuminate light bulb 56.

Initially the moveable adjusting arm 98 on the potentiometer 82 is set such that the photoresistor cells 66 and 88 provide an unbalanced condition in the bridge 96 when the mirror surface 30 is free of dew condensation. This unbalance is amplified by the amplifier transistor 74 so as to charge the capacitors 125 and 123 and thereby produce a rising control voltage across the lines 108 and 124 until a breakdown voltage level of the unijunction transistor 112 is reached. At this breakdown voltage level a surge of current flows through the primary 120 of the transformer 122 causing the voltage across lines 108 and 124 to fall back to its normal level. This surge of current through the primary 120 causes a corresponding voltage rise across the secondaries 130 and 132 which produce voltages at the gates 142 and 148 respectively such that during a positive half cycle of the alternating current source 136, current will flow through the rectifiers 140 and 146 and across the primary 160 of power transformer 19. During the negative half cycle, current will flow through the rectifiers 152 and 154 in the opposite direction across the primary 160 of the power transformer 19. The rectifiers 146 and 154 are used in conjunction with the silicon controlled rectifiers 140 and 152 respectively to minimize reverse direction leakage for the purpose of protecting the silicon controlled rectifiers.

This cyclic flow of current through the primary 160 causes a pulsating direct current flow of maximum value during this initial period through the secondary 18 and the thermoelectric cooler 10, effecting a maximum cooling rate shown by the line 218 in the FIG. 2 graph. As the temperature of the reflective surface 30 approaches the dewpoint temperature, that is, the temperature at which condensation begins to appear upon the reflective surface 30, it causes a diminution of directly reflected light at the photoresistor element 66 and an increase in the intensity of scatter light to the photoresistor element 88 which results in a reduction of the resistivity of the photoresistor element 88 and an increase in the resistivity of the photoresistor element 66. The changes in resistivity combine to produce an increased effect over that of an individual photoresistor element alone. This change in resistive effect produces decrease in the voltage differential in the bridge 96 which is further accentuated by the transistor 74 to effect a reduction in the rate at which the capacitors 123 and 125 become charged. Such reduced charging rate produces less frequent pulses across the primary 20 and thereby progressively delays the gating of the power cycle of current flow from the power source 136 through the primary 160 and thereby reduces correspondingly the rate of current flow through the cooler 10. This progressive diminution of cooling current will continue and will cause thereby a diminution in the rate of cooling of the reflective surface 30 shown by the curve 220 until the point 222 is reached at which the rate of cooling just balances the heat loss of the cooler 10 at the reflective surface 30 at which point the system is in equilibrium and remains in equilibrium until a change in dewpoint condition at the reflective surface 30 causes a corresponding tracking change in the equilibrium condition of the system as explained above.

The temperature of the reflective surface 30 is at all times continuously indicated at the temperature indicator 38 and at this condition of equilibrium remains constant as an indication of the dewpoint temperature at that time.

If at any time it is desired to check a dewpoint indication, the mirror 30 may be purged of dew by closing switch 176 for a brief period. The closing of switch 176 causes current to flow in the resistor heater 40 so as to raise the temperature of the mirror above the dewpoint and cause evaporation of condensation thereon. Upon then opening switch 176 the system will again seek equilibrium as explained above.

This invention is not limited to the details of construction and operation described as equivalents will suggest themselves to those skilled in the art.

What is claimed is:

1. A system for detecting the temperature at which a vapor begins to condense comprising, in combination, a thermoelectric cooler having a junction whose temperature diminishes in accordance with the rate of electric current through the junction in a cooling direction, a light reflective surface in thermally responsive relation to said junction and adapted for contact with said vapor, directional light means positioned for illuminating said surface in manner to cause directly reflected light rays from said surface, a pair of photoresistor means adjacent the reflective surface, one of the photoresistor means in the path of said directly reflected light rays for illumination thereby, the other of said photoresistor means positioned for illumination in part by scatter light from said reflective surface and in part by other light rays from said light means, direct current means coupled to said thermoelectric cooler for passing direct current through said junction in said cooling direction, control means coupled to said direct current means and photoresistor means in responsive relation to the difference in output of said pair of photoresistor means for changing the rate of said cooling direction direct current from said direct current means through said junction to reduce said difference in output of said photoresistor means, and means for measuring the temperature of said light reflective surface.

2. In combination, a Peltier type cooler having a cold junction responsive to cooling direction direct electric current through the cooler, the cold junction including a mirror surface adapted for confinement with a gas whose dewpoint is to be detected, an optical sensing transducer in responsive relation to dew formation on the mirror surface to effect an electric output signal proportional to the reflectivity of the mirror surface, direct current means coupled to said Peltier type cooler for supplying said cooling direction direct current, and current gating means coupled in responsive relation to the optical sensing transducer output signal and in control relation to said direct current means for limiting said supplied cooling direction current from said direct current means to the Peltier type cooler in proportional relation to the intensity of said output signal.

3. The combination as in claim 2 wherein the gating means includes an electric pulse forming circuit in responsive relation to the transducer output signal for controlling the gating means.

4. The combination as in claim 2 wherein the gating means includes an electronic current valve means in the path of current from the current means to the cooler, and an electric pulse forming circuit, the pulse forming circuit being in responsive relation to the transducer output signal and in control relation to the current valve means.

5. The combination as in claim 1 wherein the means for measuring the temperature of the reflective surface includes a temperature sensitive element in thermally responsive relation to the reflecting surface, and lead wires to the temperature sensitive element with the portion of the lead wires adjacent the temperature sensitive element being in thermally responsive relation to the reflective surface in manner to remove thermal coefficient effects of the lead wires.

6. In combination, a Peltier effect type cooler having a cold side and a cooling rate related to rate of electric current in a cooling direction through the cooler, a mirror in thermal engagement with the cold side of the cooler, a pair of photosensitive members and a light means positioned at the mirror in manner to cause an illumination differential on the photosensitive members of one magnitude when the mirror is free of condensation and of a different magnitude when condensation appears on the mirror, electric circuit means coupled to the cooler and adapted for providing direct current in said cooling direction through the Peltier effect type cooler, and current control means coupled in responsive relation to the photosensitive members and in control relation to the circuit means for varying the rate of said cooling direction current through the Peltier effect type cooler in corresponding relation to the change in said illumination differential from said one magnitude to said different magnitude.

7. The combination as in claim 6 wherein the photosensitive members are photoresistors.

8. The combination as in claim 6 wherein the control means includes a resistance bridge and the photosensitive members are photoresistors, each of which is in a separate leg of said resistance bridge.

9. A servo system comprising, in combination, a Peltier effect type cooler having a cooling rate proportional to rate of cooling direction direct current through the cooler, an electric circuit means for providing said cooling direction direct electric current to the cooler, a mirror in thermal engagement with the cooler for effecting vapor condensation on the mirror, means for producing directional rays directed at the mirror for causing directly reflected rays from the mirror, a pair of photoresistor means, one of the photoresistor means disposed to receive the directly reflected rays from the mirror, the other photoresistor means disposed to receive scatter rays from the mirror, and means in responsive relation to said photoresistor means and in control relation to the circuit means for changing said rate of cooling direction direct current to the cooler to equalize the effect on said photoresistor means of the respective received rays by said photoresistor means.

10. In a servo system for operation with an alternating current source, the combination of a pulse transformer having a primary and two secondaries, a unijunction transistor having a base and an emitter wtih the base in series with said primary, capacitor pulse forming means coupled to the emitter for causing current pulses in said primary, a thermoelectric cooler load having a cooling rate proportional to cooling direction current through said cooler, a current input circuit for delivering cooling direction current from the current source to the load, a pair of parallel coupled silicon controlled rectifiers in series with the current input circuit, each silicon controlled rectifier having an anode, cathode, and gate, one of the pulse transformer secondaries coupled across the gate and cathode of one of the silicon controlled rectifiers and the other pulse transformer secondary coupled across the gate and cathode of the other silicon controlled rectifier, and direct current means in responsive relation to the thermoelectric cooler for controlling the rate of said pulses and thereby the rate of said cooling direction current through said cooler.

11. In a servo system for operation with an alternating current source, the combination of a pulse transformer having a primary and a secondary, a unijunction transistor having a base and an emitter with the base in series with said primary, a capacitor pulse forming means coupled to the emitter for causing current pulses in said primary, a thermoelectric cooler load having a cooling rate proportional to rate of cooling direction current through the cooler, a current input circuit for delivering cooling direction current from the current source to the load, a silicon controlled rectifier having an anode, cathode and gate, with the anode and cathode in series with the current input circuit and the pulse transformer secondary coupled across the cathode and gate, and direct current means in responsive relation to the thermoelectric cooler for controlling the rate of said pulses and thereby the rate of said cooling direction current through said cooler.

12. The method of continuously tracking the dewpoint of a gas comprising, in combination, the steps of passing the gas over a reflective surface, Peltier effect cooling of the reflective surface in proportional relation to rate of an electric cooling direction current, causing said Peltier effect cooling, illuminating the reflective surface, detecting the intensity difference between direct and scatter reflections from said illuminated reflective surface, and reducing the rate of said cooling direction current and thereby the rate of said Peltier effect cooling of said reflective surface in proportional relation to said detected intensity difference from dew formation on said reflective surface until an equilibrium condtion is reached wherein a substantially uniform amount of dew is continuously maintained on said reflective surface.

References Cited by the Examiner

UNITED STATES PATENTS

| | | | |
|---|---|---|---|
| 2,720,107 | 10/55 | McBrair | 73—17 |
| 2,750,546 | 6/56 | Washburn | 73—17 X |
| 2,968,770 | 1/61 | Sylvan | 331—111 |
| 2,979,950 | 4/61 | Leone | 73—17 X |
| 3,001,125 | 9/61 | Jensen. | |
| 3,019,355 | 1/62 | Morgan | 331—111 X |
| 3,079,525 | 2/63 | Tap | 331—111 X |

RICHARD C. QUEISSER, *Primary Examiner.*

DAVID SCHONBERG, *Examiner.*

Disclaimer 3,195,344.—*Charles C. Francisco*, Watertown, Mass. DEWPOINT MEASURING SYSTEM. Patent dated July 20, 1965. Disclaimer filed June 26, 1975, by the assignee, *EG & G, Inc.*

Hereby enters this disclaimer to claims 1, 2, 5, 6, 7, 8, 9 and 12 of said patent.

[*Official Gazette March 23, 1976.*]